United States Patent
Ondracek et al.

(10) Patent No.: US 11,496,161 B2
(45) Date of Patent: Nov. 8, 2022

(54) MODULAR FILTER/DUPLEXER SYSTEM

(71) Applicant: Andrew Wireless Systems GmbH, Buchdorf (DE)

(72) Inventors: Frantisek Ondracek, Pardubice (CZ); Roman Hofman, Přelouč (CZ); Martin Kufa, Chlumec nad Cidlinou (CZ); Libor Strachon, Holice (CZ); Peter Schmid, Marxheim-Neuhausen (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 72 days.

(21) Appl. No.: 16/783,763

(22) Filed: Feb. 6, 2020

(65) Prior Publication Data

US 2020/0252091 A1     Aug. 6, 2020

Related U.S. Application Data

(60) Provisional application No. 62/802,112, filed on Feb. 6, 2019.

(51) Int. Cl.
| | | |
|---|---|---|
| *H04B 1/00* | (2006.01) | |
| *H04B 1/40* | (2015.01) | |
| *H04L 5/14* | (2006.01) | |

(52) U.S. Cl.
CPC ............. *H04B 1/0057* (2013.01); *H04B 1/40* (2013.01); *H04L 5/14* (2013.01)

(58) Field of Classification Search
CPC ........... H04B 1/0057; H04B 1/40; H04L 5/14; H01P 11/007; H01P 1/213
See application file for complete search history.

(56) References Cited

U.S. PATENT DOCUMENTS 8,254,850 B2 * 8/2012 Wayman ................ H04B 1/03
455/115.2
8,867,572 B1 * 10/2014 Zhan ................ H04B 7/15542
370/497

(Continued)

FOREIGN PATENT DOCUMENTS

| JP | H0531301 U | 4/1993 |
| KR | 101463239 B1 | 11/2014 |

OTHER PUBLICATIONS

International Searching Authority, "International Search Report and Written Opinion from PCT Application No. PCT/EP2020/052915", from Foreign Counterpart to U.S. Appl. No. 16/783,763, dated May 19, 2020, pp. 1 through 18, Published: WO.

(Continued)

*Primary Examiner* — Kibrom T Hailu
*Assistant Examiner* — Nizam U Ahmed
(74) *Attorney, Agent, or Firm* — Fogg & Powers LLC

(57) ABSTRACT

A modular filter system includes a front panel, a back panel, and a multiband combiner coupled to the front panel, the combiner including an antenna connector and filter connectors. The modular filter system further includes filter modules separate from the combiner, each filter module including first and second connectors to pass respective frequency bands, and a combiner connector to pass the frequency bands. Each filter module is configured to duplex, combine, or split first signals in the first frequency band and second signals in the second frequency band. The combiner connector of each filter module is coupled to a respective filter connector using a respective cable. The modular filter system further includes a fixing system comprising bars and plates, the bars coupled to the front and back panels using fasteners, wherein the bars and plates are configured to (Continued)

secure the filter modules between the combiner and the back panel.

26 Claims, 12 Drawing Sheets

(56) References Cited

U.S. PATENT DOCUMENTS

| | | |
|---|---|---|
| 2008/0037218 A1* | 2/2008 | Sharma ................ H05K 7/1424 |
| | | 361/730 |
| 2008/0285231 A1 | 11/2008 | Fischer et al. |
| 2010/0116545 A1 | 5/2010 | Lewison |
| 2013/0077540 A1* | 3/2013 | Black .................... H04B 1/109 |
| | | 370/277 |
| 2015/0296527 A1 | 10/2015 | Ranson et al. |
| 2017/0041125 A1 | 2/2017 | Ko |
| 2018/0069741 A1* | 3/2018 | Kummetz ................ H04B 7/02 |
| 2020/0350652 A1 | 11/2020 | Ondracek et al. |
| 2021/0013920 A1* | 1/2021 | Na ........................ H04B 17/14 |
| 2021/0058220 A1* | 2/2021 | Yang .................. H04B 1/0458 |

OTHER PUBLICATIONS

International Searching Authority, "International Search Report and Written Opinion from PCT Application No. PCT/US2021/057755 dated Feb. 15, 2022", pp. 1 through 11, Published in: KR.

China National Intellectual Property Administration, "Notification of the First Office Action" from CN Application No. 202090000430.2, dated Jun. 6, 2022, from Foreign Counterpart to U.S. Appl. No. 16/783,763, pp. 1 through 4, Published: CN.

* cited by examiner

300: modular filter system
302: filter module
304: multiband combiner
306: front panel
311: back panel
313: filter connector

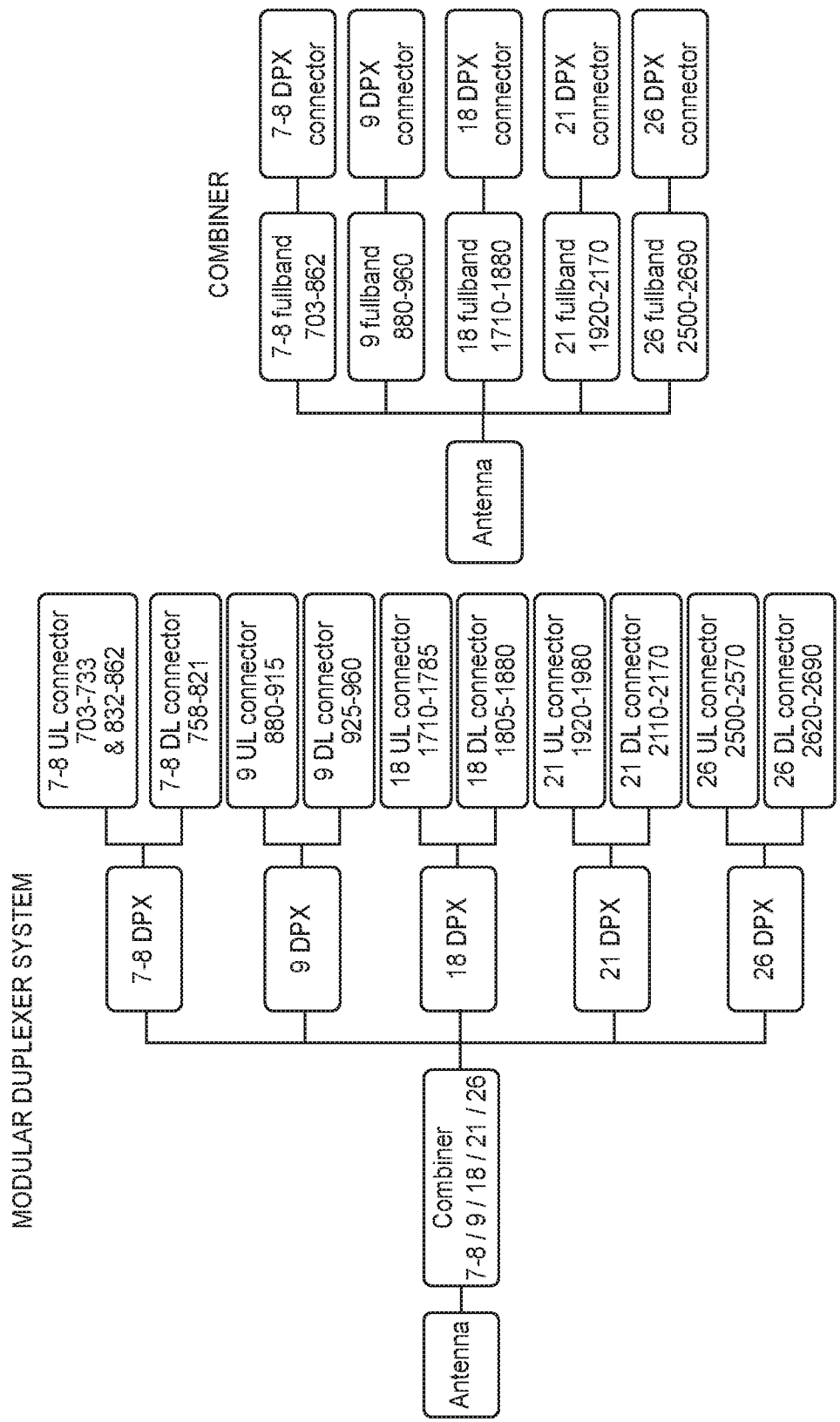

MODULAR FILTER/DUPLEXER SYSTEM

CROSS-REFERENCE TO RELATED APPLICATIONS

This application claims the benefit of U.S. Provisional Application Ser. No. 62/802,112, filed Feb. 6, 2019, and titled "MODULAR FILTER/DUPLEXER SYSTEM," which is hereby incorporated herein by reference.

BACKGROUND

Distributed antenna systems (DAS) are frequently used to improve wireless coverage provided by one or more base stations. A remote unit of a DAS typically handles multiple technologies and frequency bands by using active and passive components in a single construction. The remote unit includes or is coupled to one or more antennas and is also referred to as a remote antenna unit.

In previous designs for remote units of a DAS supporting multiple frequency bands, the remote unit assembly includes two or more customized duplexers and a combiner. These components are integrated into a single block to enable bi-directional wireless communications on multiple frequency bands using a single antenna system. The integrated blocks are generally designed and manufactured to meet individual customer requests. Modification of the blocks after manufacture is generally not feasible. If changes are desired for the remote unit after deployment (such as adding a frequency band) an entirely new integrated block is typically designed and manufactured. This increases the cost and time to market for the design. Further, if a component in the integrated block fails, it is often the case that the entire integrated block must be replaced.

SUMMARY

In some aspects, a modular filter system includes a front panel, a back panel, and a multiband combiner coupled to the front panel, wherein the multiband combiner includes an antenna connector and a plurality of filter connectors. The modular filter further includes a plurality of filter modules separate from the multiband combiner. Each filter module of the plurality of filter modules includes a first connector to pass a first frequency band, a second connector to pass a second frequency band, and a combiner connector to pass the first frequency band and the second frequency band. Each filter module of the plurality of filter modules is configured to duplex, combine, or split first signals in the first frequency band and second signals in the second frequency band. The combiner connector of each filter module of the plurality of filter modules is coupled to a respective filter connector of the plurality of filter connectors using a respective cable. The modular filter system further includes a fixing system that includes a plurality of bars and a plurality of plates, wherein the plurality of bars is coupled to the front panel and the back panel using fasteners, wherein the plurality of bars and the plurality of plates are configured to secure the plurality of filter modules between the combiner and the back panel.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 10A-10C are block diagrams of example modular duplexer systems and combiners having different example combinations of frequency bands.

Figure 1:
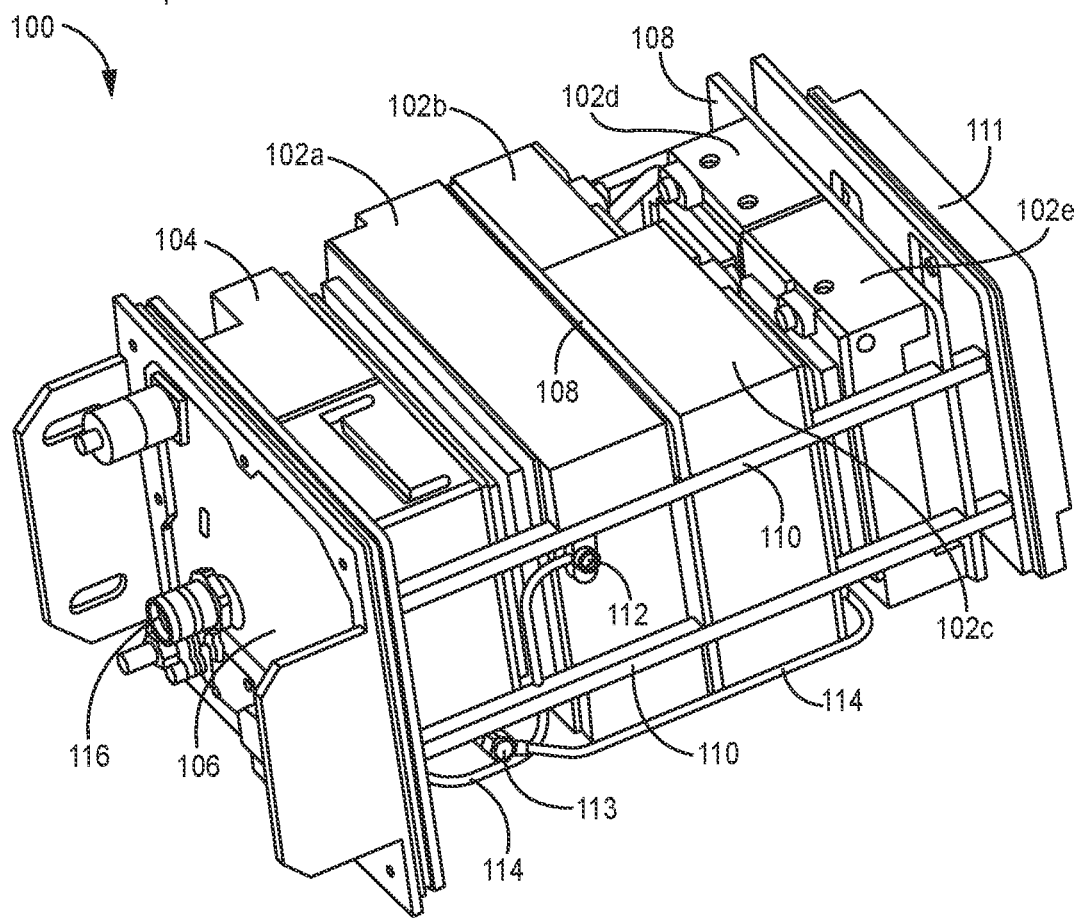
FIG. 1 is a side perspective view of an example modular filter system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates an example of a modular filter system 100. For ease of illustration, one or more components of the modular filter system 100 are omitted from the figures (such as, for example, some cabling, connectors, etc.), but are described below.

In the example shown in FIG. 1, the modular filter system 100 includes a plurality of filter modules 102, a combiner 104 (also referred to as a multiband combiner), a front panel 106, a fixing system that includes two or more plates 108 and bars 110, and a back panel 111. It should be understood that the particular components and configuration of the components of the modular filter system 100 can vary depending on requirements.

Each of the plurality of filter modules 102 is configured to duplex, split, or combine signals in a single frequency band or a combination of close frequency bands. Further, each of the plurality of filter modules 102 includes at least one pass filter for each range of frequencies the filter module 102 duplexes, splits, or combines. In some examples, a filter module 102 of the plurality of filter modules 102 is a duplexer module. In such examples, each of the plurality of duplexer modules 102 is configured to duplex uplink and downlink signals in a single frequency band or combination of close frequency bands. In some examples, a filter module 102 is a diplexer module configured to combine two frequency bands for output at a common port or connector. In some examples, a filter module 102 is a diplexer module configured to split combined frequency bands for output at separate ports or connectors.

Each of the plurality of filter modules 102 includes two or more connectors, which are configured to couple the filter modules 102 to other components in a system. In some examples, the two or more connectors of each filter module 102 are coupled to another component (for example, the back panel or a power amplifier) with a 50-ohm coaxial cable. In examples where the filter modules 102 are duplexer modules, each duplexer module 102 includes an uplink connector and a downlink connector, which are configured to couple the duplexer module 102 to other components in a node of a telecommunications system (such as a remote antenna unit of a distributed antenna system or cloud/centralized radio access network (C-RAN)). For example, the downlink connector is configured to be coupled to a power amplifier of a node of a telecommunications system. In examples where the filter modules 102 are combiner modules, each combiner module 102 includes a respective connector for each respective frequency band or combination of close frequency bands that are being combined. In some examples, each respective connector of a combiner module 102 is coupled to a respective power amplifier in a node of a telecommunications system. In examples where the filter modules 102 are splitter modules, each splitter module 102 includes a respective connector for each respective frequency band or combination of close frequency bands that are being split. In some examples, each respective connector of a splitter module 102 is coupled to a respective low-noise amplifier in a node of a telecommunications system.

Each filter module 102 also includes a combiner connector 112 that is configured to be coupled to a connector 113 of the combiner 104 via a cable 114. In some examples, the combiner connector 112 of each filter module 102 is coupled to the connector 113 of the combiner 104 with a 50-ohm coaxial cable. In some examples, the combiner connectors 112 of the filter modules 102 are positioned based on how the filter module 102 fits between the bars 110 and plates 108.

The dimensions of the individual filter modules 102 are dependent on the particular frequency band or combination of close frequency bands that the filter module 102 is configured to pass. In some examples, the frequency bands of the filter modules 102 correspond to standard frequency bands for mobile communications. In some examples, a filter module 102 configured to duplex, combine, or split signals in a lower frequency band for mobile radio frequency communications (such as, for example, below 1 GHz) is longer than filter module 102 configured to duplex, combine, or split signals in a higher frequency band for mobile radio frequency communications (such as, for example, above 1.4 GHz). These ranges are by way of example and it should be understood that a filter module can be configured to pass any desired frequency band or combination of close frequency bands.

The plurality of filter modules 102 are positioned between the combiner 104 and the back panel 111. In some examples where the filter modules 102 are duplexer modules, each duplexer module 102 includes an uplink filter, a downlink filter, and a low-noise amplifier integrated into the duplexer module. In some examples, the low-noise amplifier is coupled between the uplink filter and the uplink connector of the duplexer module 102. In some examples where the filter modules 102 are splitter modules, each splitter module 102 includes respective filters and low-noise amplifiers integrated into the splitter module. In some examples, the filter modules 102 are positioned between the combiner 104 and other components of a node of a telecommunications system (such as, for example, a power amplifier).

In some examples, the combiner 104 includes a respective connector 113 for each filter module 102 and thus for each frequency band serviced by the modular filter system 100. In one direction (for example, the downlink), the combiner 104 is configured to combine signals from the plurality of frequency bands provided by the filter modules 102 and provide the combined signals to the antenna connector 116. The antenna connector 116 is configured to be coupled to a multiband antenna (or antenna system) for radiation of the downlink signals. In some examples, the combiner 104 is configured for phase combining or cross-combining the frequencies. In the other direction (for example, the uplink), the combiner 104 is configured to split the received signal from the antenna connector 116 and provide the uplink signals in the respective frequency bands to the respective connector 112 for the filter module 102 configured to duplex or split signals in the respective frequency band or combination of close frequency bands.

Figure 10A:
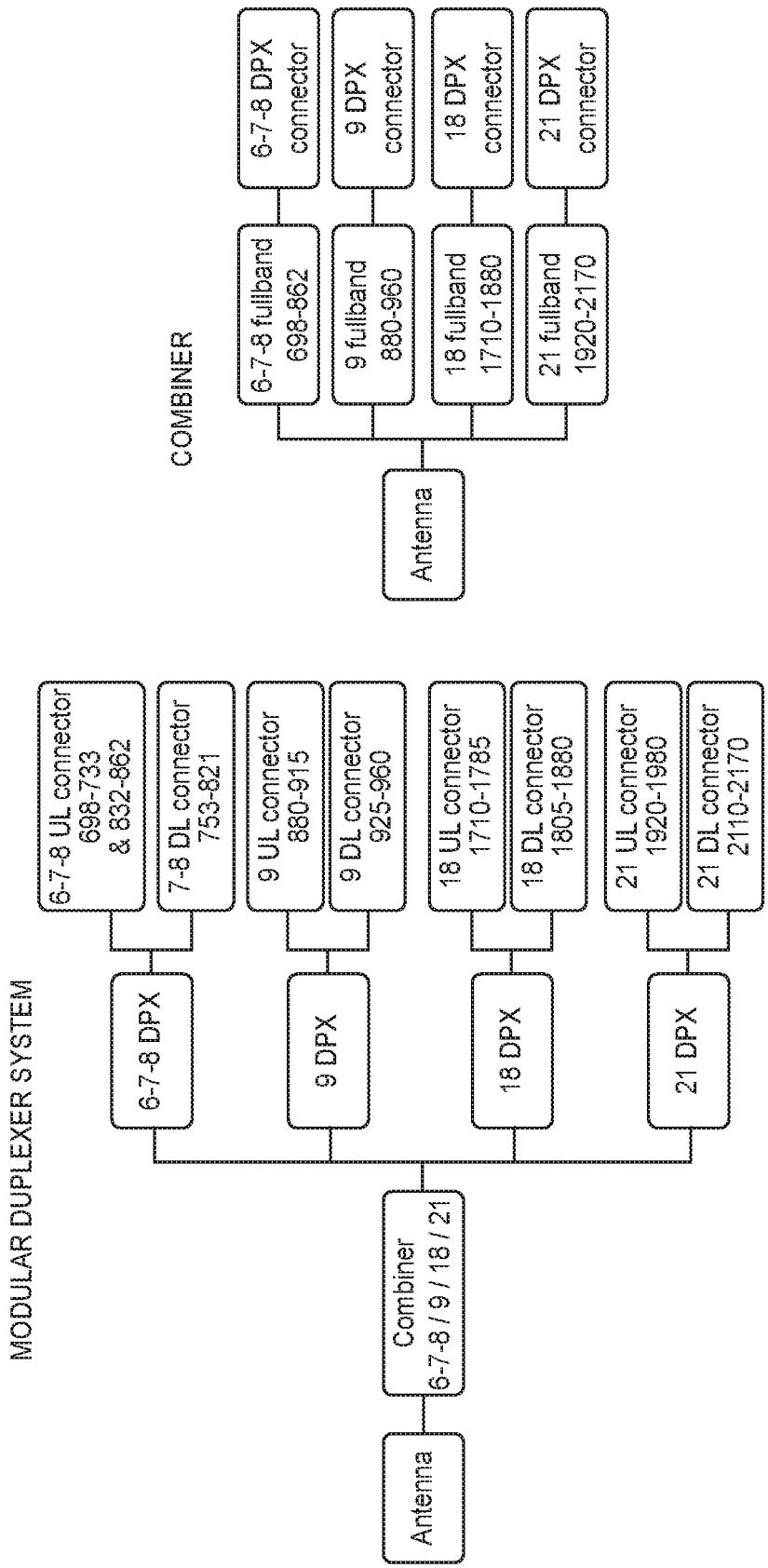
Figure 10C:
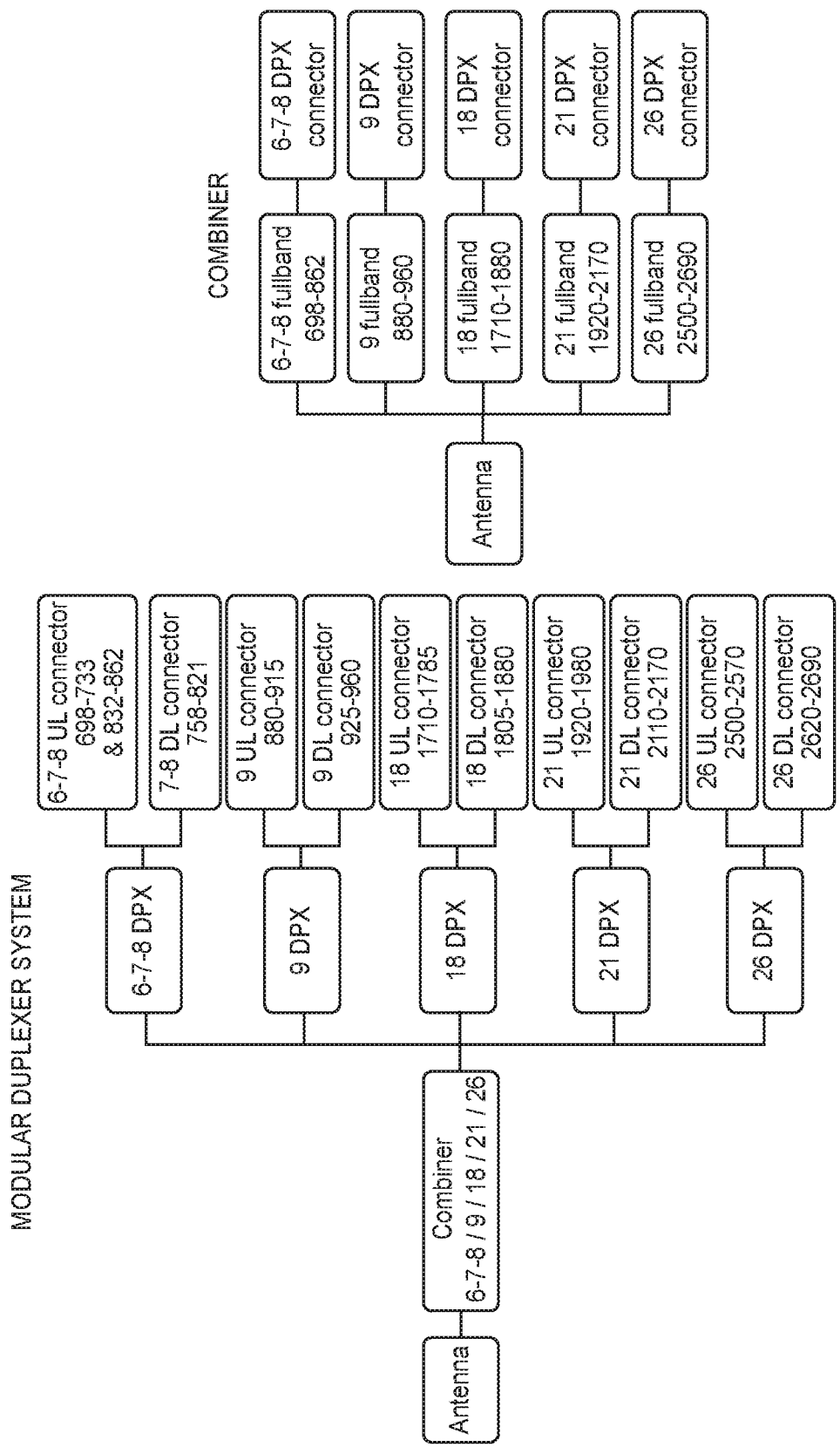

In some examples, the combiner 104 is specifically designed for use with only the particular frequency bands that are originally included in the modular filter system 100 at manufacture. In such examples, adding a filter module 102, and thus adding another frequency band, may require the combiner 104 to be replaced. However, a new combiner may not be required if the adjustment to the combination of filter modules 102 instead includes replacing one filter module 102 with another filter module 102 (for example, swapping frequency bands or replacing a faulty module). In some examples, the combiner 104 is configured to have wider passbands for the connectors to enable some flexibility for swapping out filter modules configured to duplex, combine, or split different frequency bands. For example, a lower frequency band duplexer module (such as 7-8 DPX of FIG. 10B) could be swapped for another lower frequency band duplexer module (such as 6-7-8 DPX of FIG. 10A or 10B) if the passband filter coupled to the connector of the combiner is sufficiently wide to pass both frequency bands. In the example above referring to FIGS. 10A-10C, the 6-7-8 fullband filter in FIGS. 10A and 10C is capable of passing the frequency band from the 7-8 DPX of FIG. 10B, so a 7-8 DPX of FIG. 10B could be swapped for the 6-7-8 DPX of FIG. 10A or 10C, if desired.

In some examples, the front panel 106 of the modular filter system 100 includes ports or connectors to couple the modular filter system 100 to other devices. For example, the front panel can include a mains power connector, an optical connector to couple to another component of the telecommunications system, etc.

In the modular filter system 100 shown in FIG. 1, the filter modules 102 are oriented parallel to the front panel 106. That is, the filter modules 102 are particularly oriented such that the length of the filter modules 102 runs parallel to the face of the front panel 106. The filter modules 102 are stacked or otherwise arranged in a manner that extends away from the combiner 104 in a single dimension. The number of filter modules 102 corresponds to the number of frequency bands supported by the modular filter system 100.

Since the modular filter system 100 does not include an integrated block like previous designs, the combiner 104 and particularly the plurality of filter modules 102 should be rigidly secured in place to avoid movement of the components, which could result in detachment of the cables or other faults. Therefore, in some examples, the filter modules 102 and the combiner 104 are secured in place using a plurality of bars 110 and a plurality of plates 108. In the modular filter system 100 shown in FIG. 1, the modular filter system 100 includes two plates 108 and four bars 110 to secure the filter modules 102 and the combiner 104. However, it should be understood that a different number of plates 108 and bars 110 can be utilized depending on the number of filter modules 102.

In some examples, the filter modules 102 are coupled to the plates 108 using one or more fasteners (for example, screws). In other examples, the filter modules are not fastened to the plates 108 but are coupled to the plates 108 using pressure produced by fastening the bars 110 to other components, such as the combiner 104, front panel 106, and/or back panel 111. In the modular filter system 100 shown in FIG. 1, the plates 108 include notches to lock onto the bars 110.

In some examples, the filter modules 102 and/or the combiner 104 include one or more notches, grooves, and/or recesses to allow the bars 110 to pass through and more securely fix the components of the modular filter system 100. In the example shown in FIG. 1, the filter module 102a includes a large groove that accommodates multiple bars 110 whereas filter module 102c includes smaller notches such that only a single bar 110 passes through each notch. It should be understood that a variety of designs for the filter modules 102 are feasible based on the size of the filter modules 102 and the space constraints for the modular filter system 100.

In some examples, when more frequency bands are desired to be added after installation, the modular filter system 100 can be modified by adding a filter module 102, which only requires expansion in a single dimension (along the longitudinal axis of the modular filter system 100). In some examples, the addition of a band may require longer bars 110 to be used for the modular filter system 100. In some examples, additional plates 108 may also be used to secure the filter modules 102 in place. It should be understood that the specific modifications required are dependent on the particular frequency band being added and the total number of frequency bands already included in the modular filter system 100.

In some examples, the addition of a band may also require replacement of the combiner 104 if the original combiner did not include a sufficient number of connectors to accommodate an additional filter module 102. For example, if the combiner included three connectors and desired change to the modular filter system 100 was to add a fourth filter module 102, the three-connector combiner would need to be replaced with a four-connector combiner.

In some examples, the addition of a band may not require replacement of the combiner if the original combiner includes one or more connectors beyond the number of filter modules included in the modular filter system. For example, if the combiner included four connectors and desired change to the modular filter system 100 was to add a fourth filter module, the four-connector combiner would include a sufficient number of connectors. In some examples, the temporarily unused (for example, not coupled to a filter module 102) connector of the combiner can be terminated using a termination load (for example, a 50-ohm load) or covered using a connector cover.

In some examples, the particular position of at least one of the filter modules 102 in the modular filter system 100 is determined based on the concept of reducing or minimizing insertion loss. For example, a filter module 102 with highest insertion loss can be positioned in this manner. In some examples, the insertion loss is reduced by reducing the total cable length for the filter module 102. In such examples, the total cable length from the filter module 102 to the combiner 104 is considered as well as the cable length from the filter module 102 to another component (for example, the back panel or a power amplifier) in the communication path.

The design of the modular filter system 100 includes a sacrifice of radio frequency performance for a significant cost reduction and faster time to market compared to the integrated approach discussed above. The use of cabling between the filter modules 102 and the combiner 104 introduces a greater amount of insertion loss than previous integrated approaches, but the modular filter system 100 is designed to require less development time and resources for individual requests than previous designs. The filter modules 102 can also be manufactured in higher volumes, which further reduces cost.

The design of the modular filter system 100 advantageously enables modifying the number of frequency bands (for example, adding a frequency band) after manufacture using off-the-shelf stock filter modules and by expanding/contracting the modular filter system 100 in a single dimension (longitudinally). Also, depending on the design of the combiner 104, there may be sufficient flexibility for swapping out one filter module for another filter module configured to duplex signals in a similar frequency band. Such flexibility enables rapid changes in the frequency bands without requiring an entirely redesigned integrated block.

Figure 2:
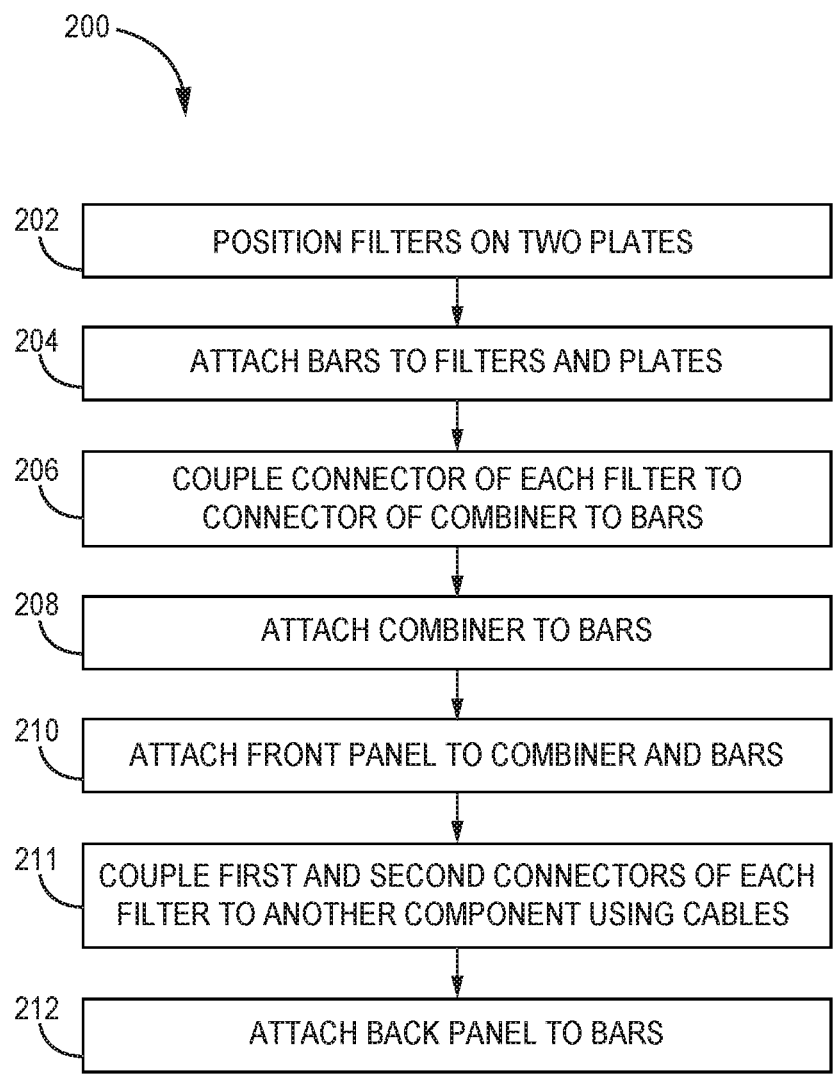
FIG. 2 is a flow diagram of an example method of assembling a modular filter system.

FIG. 2 is a flow diagram of an example method 200 of assembling the modular filter system 100. The common features discussed above with respect to modular filter system 100 in FIG. 1 can include similar characteristics to those discussed with respect to method 200 and vice versa.

The method 200 includes positioning a plurality of filter modules between two or more plates (block 202). In some examples, positioning the plurality of filter modules between the two or more plates includes attaching the filter modules to the plates using fasteners (for example, screws). In some examples, each of the plurality of filter modules is oriented parallel to the front panel and combiner of the modular filter system.

In some examples, at least one filter module is positioned in a manner that minimizes insertion loss. In some examples, the insertion loss is reduced for a filter module having the highest insertion loss by reducing the total cable length for that filter module. In such examples, the total cable length from the filter module to the combiner is considered as well as the cable length from the filter module to another component in the communication path.

The method 200 further includes attaching bars to the filter modules and the plates (block 204). In some examples, the bars are mounted to the filter modules and the plates using one or more fasteners (for example, screws). In some examples, the plates include notches to lock onto the bars, and the filter modules include grooves or recesses for the bars to extend through for better fixing.

The method 200 further includes connecting cables to a combiner connector of each filter module and the respective connector of the combiner (block 206). In some examples, the cable is a 50-ohm coaxial cable. In other examples, the characteristic impedance of the cable could be different depending on the desired performance characteristics of the system.

The method 200 further includes attaching the combiner to the bars (block 208). In some examples, the combiner is attached to the bars using one or more fasteners (for example, screws).

The method 200 further includes attaching the front panel to the combiner and bars (block 210). In some examples, the front panel is attached to the combiner and bars using one or more fasteners (for example, screws). For example, the front panel is attached to the end of the bars used to secure the combiner and filter modules.

The method 200 optionally includes connecting cables to first and second connectors of each filter module and another component (block 211). In some examples, the other component is the back panel, low-noise amplifier, or a power amplifier. In some examples, the cable is a 50-ohm coaxial cable. In other examples, the characteristic impedance of the cable could be different depending on the desired performance characteristics of the system.

The method 200 further includes attaching the back panel to one of the plates and the bars (block 212). In some examples, the back panel is attached to the plate and bars using one or more fasteners (for example, screws). For example, the back panel is attached to the bars used to secure the combiner and filter modules at the opposite end compared to the front panel.

While the method 200 of assembling the modular filter system is discussed in a particular order, it should be understood that the method 200 is not limited to the particular order shown in FIG. 2 or described above and can be assembled in other ways. For example, the back panel can be coupled to other components prior to the front panel being coupled to the combiner and bars.

FIGS. 3-6 illustrate various views of an example modular filter system 300. For ease of illustration, one or more components of the modular filter system 300 are omitted from the figures (such as, for example, cabling), but are described below. The modular filter system 300 includes similar features to those included in the modular filter system 100 discussed above with respect to FIGS. 1-2. The similar features included in modular filter systems 100, 300 are numbered similarly. For example, the front panel 106 in FIG. 1 is similar to the front panel 306 in FIG. 3. The functions, structures, and other descriptions of elements for such features described with respect to one figure may apply to similarly named features included in the other figures and vice versa.

In the example shown in FIGS. 3-6, the modular filter system 300 includes a plurality of filter modules 302, a combiner 304, a front panel 306, a fixing system that includes a plurality of plates 309 and a plurality of bars 307, 310, and a back panel 311. It should be understood that the particular components and configuration of the components of the modular filter system 300 can vary depending on requirements.

Generally, the filter modules 302 are similar to the filter modules 102 used in the modular filter system 100 described above. However, the filter modules 302 in the modular filter system 300 differ from the filter modules 102 for the modular filter system 100 in some ways.

Figure 3:
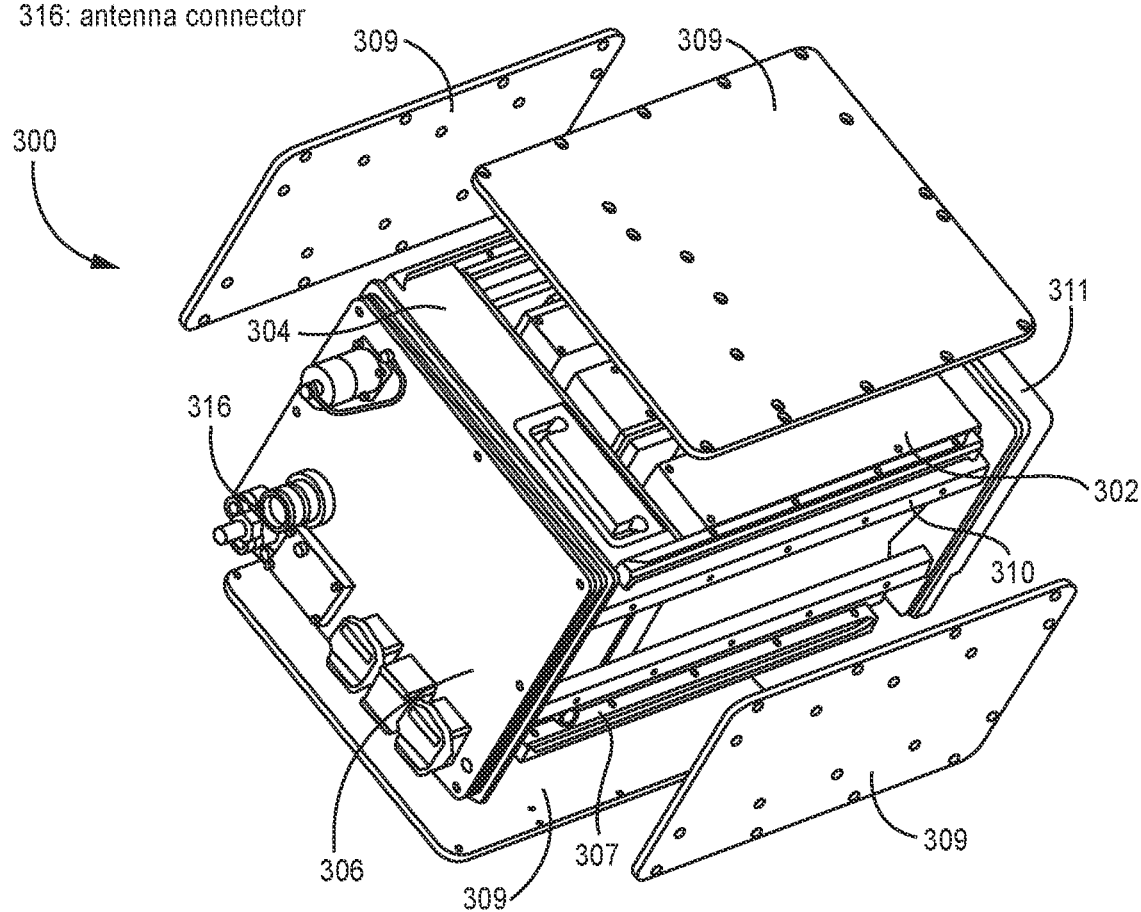
FIG. 3 is an exploded side perspective view of an example modular filter system.

For example, in the modular filter system 300 shown in FIG. 3, the filter modules 302 are oriented perpendicularly to the front panel 306 rather than parallel. That is, the filter modules 302 are particularly oriented such that the length of the filter modules 302 runs perpendicular to the face of the front panel 306 and parallel to the longitudinal axis of the modular filter system 300.

Like the filter modules 102 in FIG. 1, the dimensions of the filter modules 302 in FIGS. 3-6 are dependent on the particular frequency band that the filter module 302 is configured to pass. However, the connectors (not shown) on the filter modules 302 are particularly designed to reduce cable lengths based on the specific orientation of the filter modules 302. In some examples, the two connectors (for example, uplink and downlink connectors) of the filter modules 302 are positioned at the end of the filter module 302 nearest the back panel 311, and the combiner connector is positioned at the end of the filter module 302 nearest the combiner 304. As discussed below, this design is particularly advantageous for reducing insertion loss of the filter modules 302 since it minimizes cable length.

In some examples, the filter modules 302 are arranged in a manner corresponding to the order of the connectors 313 of the combiner 304. For example, if the connector for a first frequency band is positioned between connectors for second and third frequency bands, the filter module 302 configured to pass signals in the first frequency band will be positioned between the filter modules 302 configured to pass the second and third frequency bands.

Since the modular filter system 300 does not include an integrated block like previous designs, the combiner 304 and particularly the plurality of filter modules 302 should be rigidly secured in place to avoid movement of the components, which could result in detachment of the cables or other faults. Therefore, the filter modules 302 and the combiner 304 are secured in place using a plurality of bars 307, 310 and a plurality of plates 309. In the modular filter system 300 shown in FIGS. 3-4, the modular filter system 300 includes four plates 309 and eight bars 307, 310 to secure the filter modules 302 and the combiner 304. However, it should be understood that a different number of plates and bars can be utilized depending on the number of filter modules.

Figure 4:
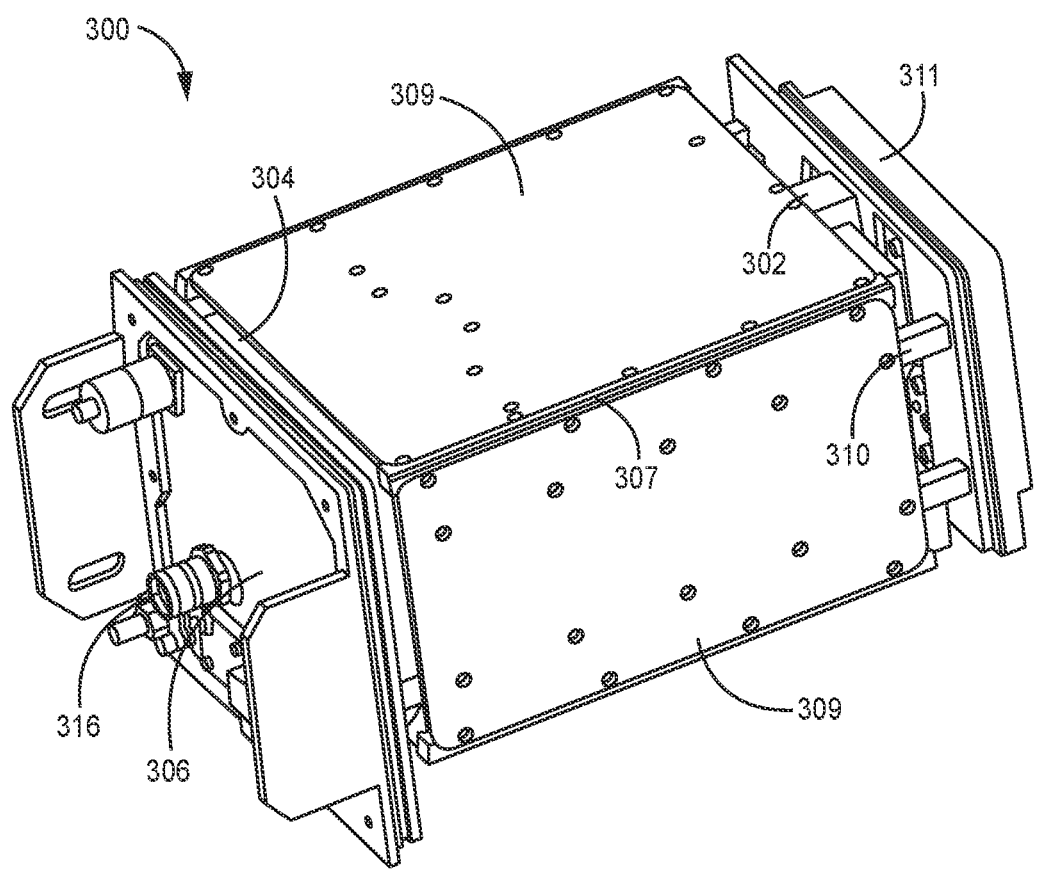
FIG. 4 is a side perspective view of an example modular filter system.
Figure 5:
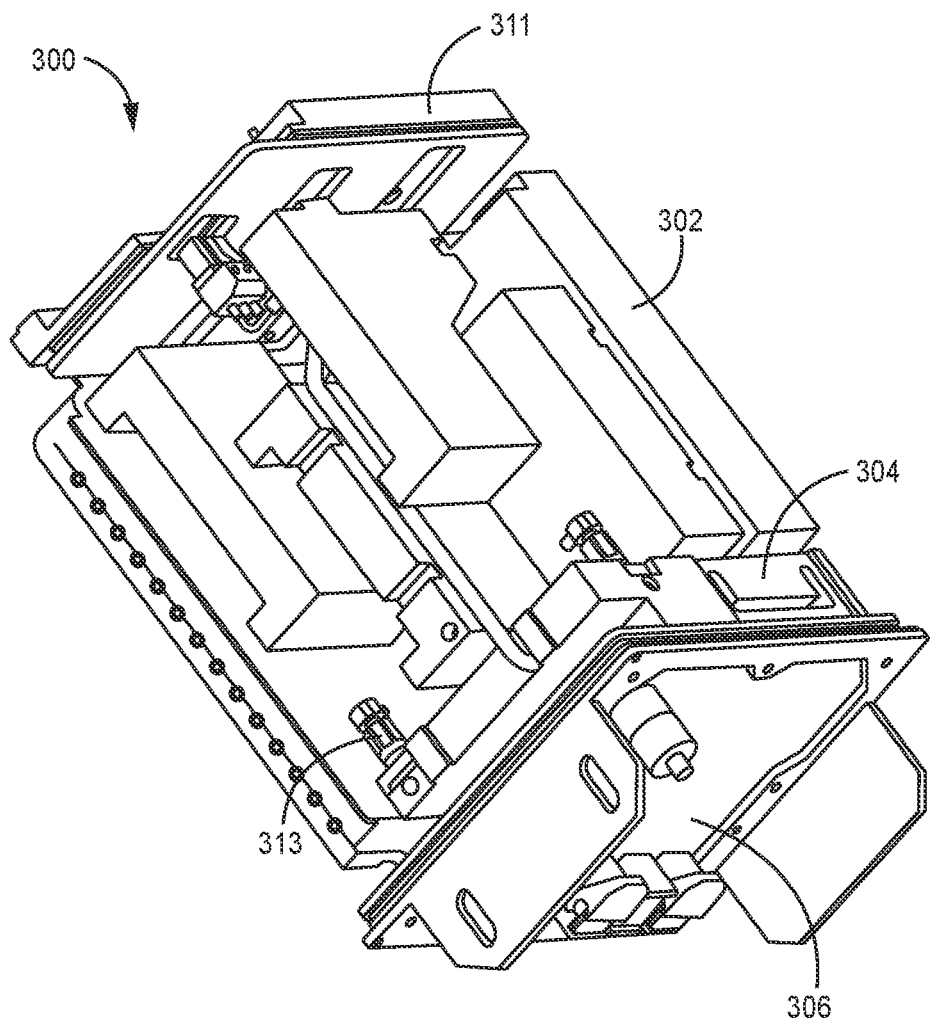
FIG. 5 is a side perspective view of an example modular filter system.
Figure 6:
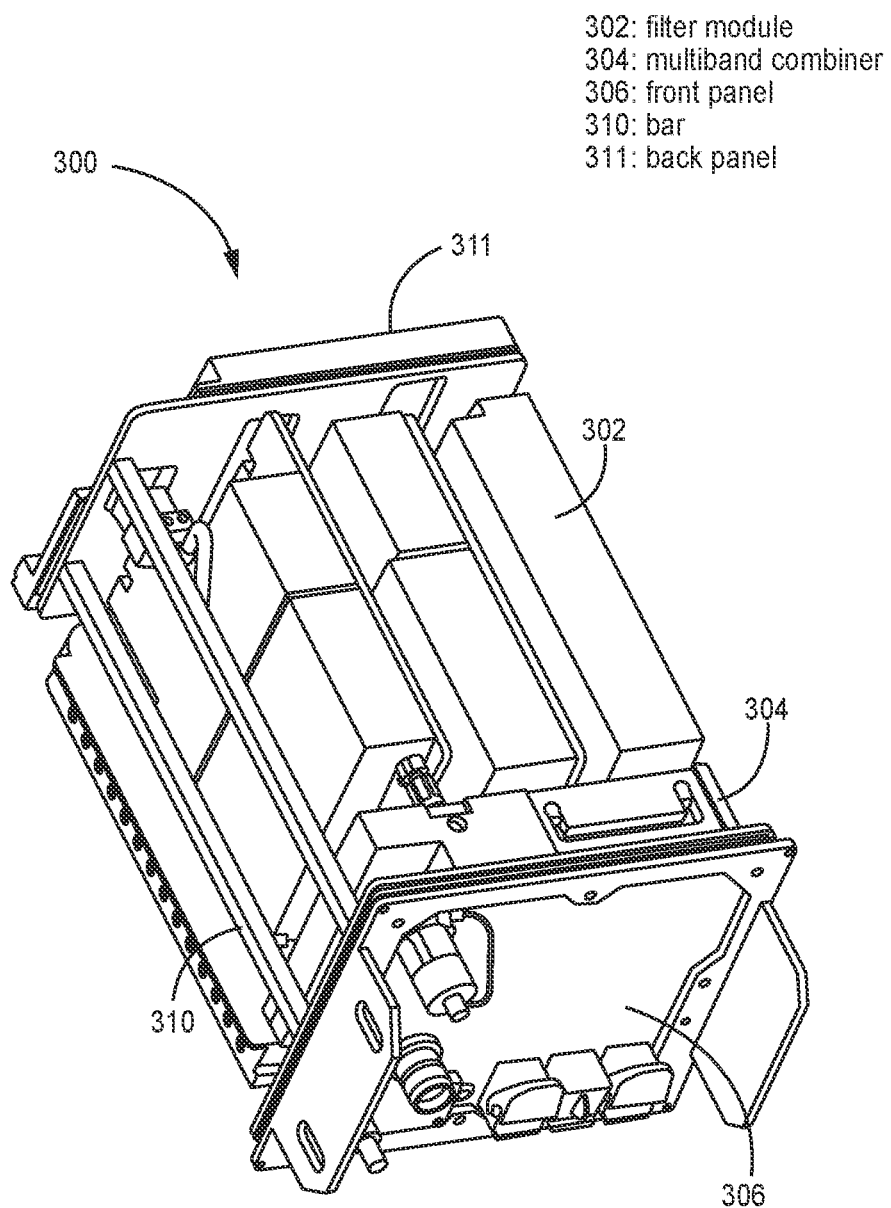
FIG. 6 is a side perspective view of an example modular filter system.

In the example shown in FIGS. 3-4, which illustrate exploded and assembled views of the modular filter system 300, the plurality of plates 309 and the plurality of bars 307, 310 include a large number of holes to receive fasteners. The holes in the plates 309 and the bars 307, 310 are designed to match holes in the filter modules 302, the combiner 304, the front panel 306, and the back panel 311. Further, many of the holes in the plurality of bars 307, 310 are used to secure the plurality of plates 309 to the bars 307, 310 such that the plates 309 surround the combiner 304 and the filter modules 302.

In some examples, the modular filter system 300 can be modified in a manner similar to the modular filter system 100, but the process is more time consuming because it has the covered design. For example, if the adjustment to the combination of filter modules 302 includes replacing one filter module with another filter module (for example, swapping frequency bands or replacing a faulty module), a majority of bars 307, 310 and plates 309 must be removed before such a change can be implemented.

Unlike the modular filter system 100, it can be difficult to add frequency bands to the modular filter system 300 due to space constraints and the positioning of the filter modules 302. In particular, due to the orientation of the filter modules 302, increasing the number of frequency bands would likely require expanding the dimensions of the modular filter system 300 perpendicular to the length of the modular filter system 300. This is problematic because the space within the bars 307, 310 and plates 309 is limited and expansion that is parallel to the front panel 306 would require increasing the size of most, if not all, of the components.

The design of the modular filter system 300 can be more advantageous from an insertion loss perspective, particularly for combinations of frequency bands that have similarly sized filter modules 302. The insertion loss is reduced by minimizing the total cable length for each of the filter modules 302. In such examples, the total cable length from the filter module to the combiner is considered as well as the cable length from the filter module to another component in the communication path (for example, a power amplifier).

The modular filter system 100 described above with respect to FIGS. 1-2 has some advantages over the modular filter system 300 described above with respect to FIGS. 3-7. For example, the assembly of the modular filter system 100 is generally easier since there are fewer components and less complexity in securing the components to each other. The rail design in FIG. 1 is also easier to visually inspect and debug as it is not covered like the slot design in FIGS. 3-6. Further, the rail design in FIG. 1 can also be manufactured for about 5-10% cheaper than the slot design in FIGS. 3-6.

The modular filter system 300 described above with respect to FIGS. 3-6 also has some advantages over the modular filter system 100 described above with respect to FIGS. 1-2. For example, the positioning of the filter modules 302 in the slot design enables shorter cables to be used, which leads to lower insertion loss compared to the rail design. The slot design also enables easier cable routing and attachment since the connectors for the filter modules 302 are more uniformly positioned and closer to the connectors 313 of the combiner 304 and other components (for example, back panel or power amplifiers). Further, since the modular filter system 300 includes the plates 309 surrounding the filter modules 302 and the combiner 304, it is easier to handle and manipulate than the modular filter system 100.

The design of the modular filter system 300 includes less sacrifice of radio frequency performance compared to the modular filter system 100, but the cost reduction and speed to market compared to the integrated approach discussed above is not as great. The use of cabling between the filter modules 302 and the combiner 304 introduces more insertion loss than previous integrated approaches, but the modular filter system 300 still requires less development time and resources for individual requests than previous integrated designs. Further, the design of the modular filter system 300 includes swappable off-the-shelf modules that can be manufactured in bulk with reduced cost.

Figure 7:
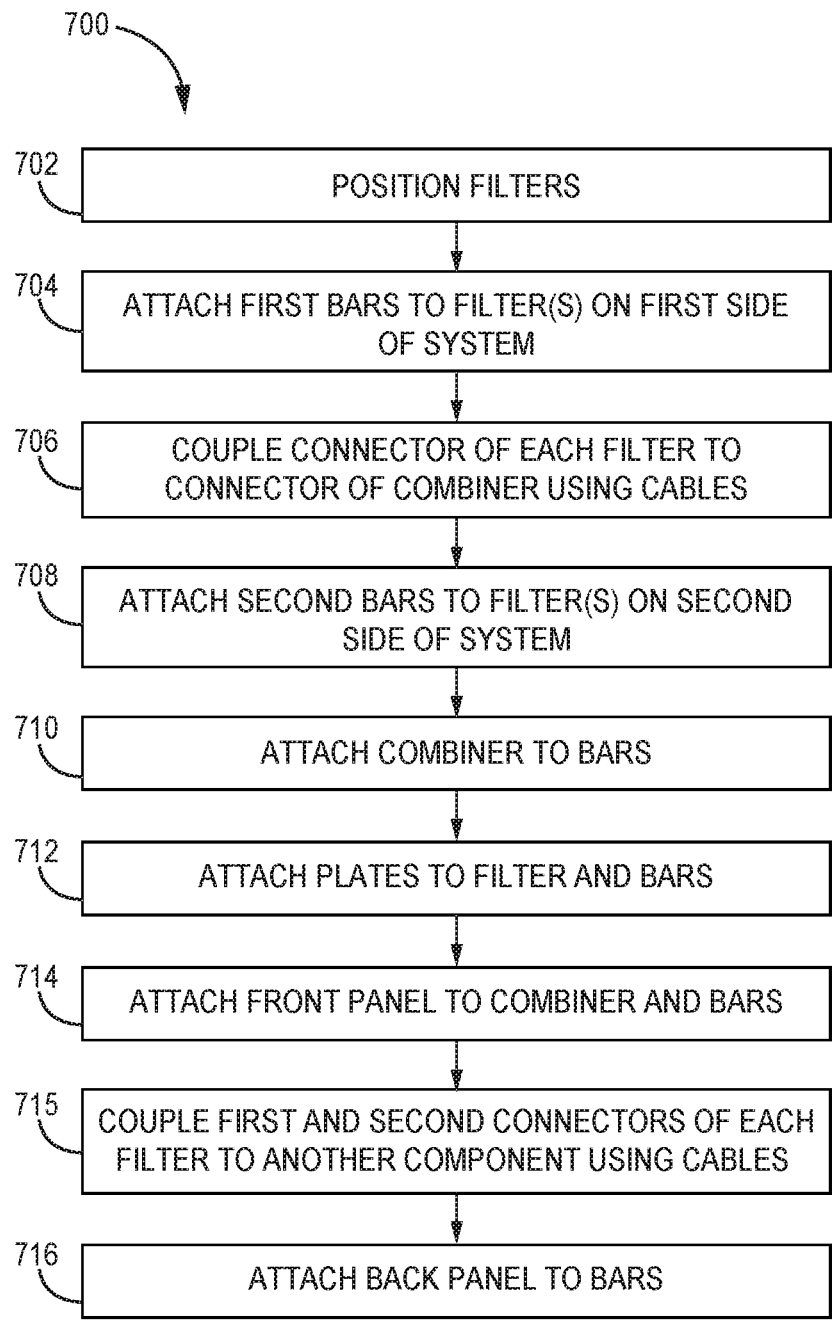
FIG. 7 is a flow diagram of an example method of assembling a modular filter system.

FIG. 7 is a flow diagram of an example method 700 of assembling the modular filter system 300. The common features discussed above with respect to modular filter system 300 in FIG. 3-6 can include similar characteristics to those discussed with respect to method 700 and vice versa.

While the method 700 of assembling the modular filter system node of the telecommunications system is discussed in a particular order, it should be understood that the method 700 is not limited to the particular order shown in FIG. 7 or described below. In particular, since the node of a telecommunications system discussed herein includes flexible modules rather than predefined blocks, the node can be assembled in a number of different ways.

The method 700 includes positioning a plurality of filter modules (block 702). In some examples, arranging the plurality of filter modules includes organizing the plurality of filter modules in an order matching the order of connectors of the combiner. In some examples, the each of the plurality of filter modules is oriented perpendicular to the front panel and combiner of the modular filter system.

The method 700 further includes attaching a first plurality of bars to one or more filter modules on a first side of the modular filter system (block 704). In some examples, the bars are mounted to one or more filter modules using one or more fasteners (for example, screws). In some examples, the first plurality of bars is only attached to a single filter module.

The method 700 further includes connecting cables to the connector of each filter modules and the respective connector of the combiner (block 706). In some examples, the cable is a 50-ohm coaxial cable. In other examples, the characteristic impedance of the cable could be different depending on the desired performance characteristics of the system. In some examples, the length of each cable can be determined in order to provide required impedance matchings from each of the filter modules to the combiner.

The method 700 further includes attaching a second plurality of bars to one or more filter modules on a second side of the modular filter system (block 708). In some examples, the second plurality of bars are mounted to the filter modules using one or more fasteners (for example, screws). In some examples, the second plurality of bars are mounted on the side of the filter modules that is opposite the first plurality of bars.

The method 700 further includes attaching the combiner to the bars (block 710). In some examples, the combiner is attached to the bars using one or more fasteners (for example, screws).

The method 700 further includes attaching plates to the filter modules and the first and second plurality of bars (712). In some examples, the plates are attached to the other components using one or more fasteners (for example, screws). In some examples, each bar the subset of the first plurality of bars and a subset of the second plurality of bars include a plurality of holes.

The method 700 further includes attaching the front panel to the combiner (block 714). In some examples, the front panel is attached to the combiner and bars using one or more fasteners (for example, screws). In some examples, the front panel is also attached to a subset of the first plurality of bars and a subset of the second plurality of bars using one or more fasteners (for example, screws).

The method 700 optionally includes connecting cables to first and second connectors of each filter module and another component (block 715). In some examples, the other component is the back panel, low-noise amplifier, or a power amplifier. In some examples, the cable is a 50-ohm coaxial cable. In other examples, the characteristic impedance of the cable could be different depending on the desired performance characteristics of the system.

The method 700 further includes attaching the back panel to a plurality of the bars (block 716). In some examples, the back panel is attached to the bars using one or more fasteners (for example, screws).

Figure 8:
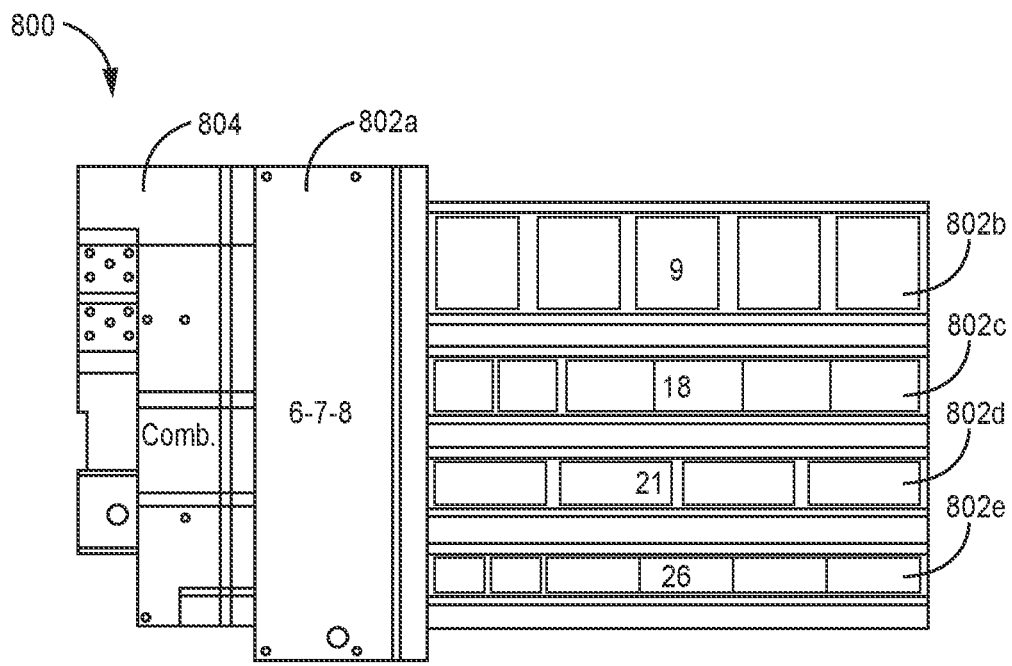
FIG. 8 is a top view of an example modular filter system.

FIG. 8 illustrates an example modular filter system 800. For ease of illustration, one or more components of the modular filter system 800 are omitted from the figures (such as, for example, cabling), but are described below. The modular filter system 800 includes similar features to those included in the modular filter systems 100, 300 discussed above with respect to FIGS. 1-7. The similar features included in modular filter systems 100, 300, 800 are numbered similarly. For example, the combiner 104 in FIG. 1 is similar to the combiner 804 in FIG. 8. The functions, structures, and other descriptions of elements for such features described with respect to one figure may apply to similarly named features included in the other figures and vice versa.

The modular filter system 800 is a hybrid between the modular filter system 100 (referred to as the "rail solution") and the modular filter system 300 (referred to as the "slot solution"). In the example shown in FIG. 8, the modular filter system 800 includes a plurality of filter modules 802 and a combiner 804. For ease of illustration, other components of the modular filter system 800, such as a front panel, a back panel, or a fixing system, are omitted. It should be understood that the particular components and configuration of the components of the modular filter system 800 can vary depending on requirements.

Generally, the filter modules 802 are similar to the filter modules 102, 302 used in the modular filter systems 100, 300 described above. However, the filter modules 802 in the modular filter system 800 differ from the filter modules 102, 302 for the modular filter systems 100, 300 in some ways. For example, in the modular filter system 800 shown in FIG. 8, at least one filter module 802a is oriented differently than other filter modules 802b-e in the modular filter system 800. In the example shown in FIG. 8, filter module 802a is oriented parallel to the combiner 804. That is, the filter module 802a is particularly oriented such that the length of the filter module 802a runs parallel to the face of the combiner 804 and perpendicular to the longitudinal axis of the modular filter system 800. In the example shown in FIG. 8, the other filter modules 802b-e are oriented perpendicularly to the combiner 804. That is, the filter modules 802b-e are particularly oriented such that the length of the filter modules 802b-e runs perpendicular to the face of the combiner 804 and parallel to the longitudinal axis of the modular filter system 800.

Like the filter modules 102, 302 in FIGS. 1 and 3-6, the dimensions of the filter modules 802 in FIG. 8 are dependent on the particular frequency band that the filter module 802 is configured to pass. However, the connectors (not shown) on some of the filter modules 802b-e are particularly designed to reduce cable length based on the specific orientation of the filter modules 802b-e. In some examples, the two connectors (for example, uplink and downlink connectors) of the filter modules 802 are positioned at the end of the filter module 802 nearest the back panel (not shown), and the combiner connector is positioned at the end of the filter module 802 nearest the combiner 804. As discussed below, this design is particularly advantageous for reducing insertion loss of the filter modules 802b-e since it minimizes cable length.

In some examples, the filter modules 802 are arranged in a manner corresponding to the order of the connectors of the combiner 804. For example, if the connector for a first frequency band is positioned between connectors for second and third frequency bands, the filter module 802c configured to pass signals in the first frequency band will be positioned between the filter modules 802b, 802d configured to pass the second and third frequency bands.

Since the modular filter system 800 does not include an integrated block like previous designs, the combiner and particularly the plurality of filter modules 802 should be rigidly secured in place to avoid movement of the components, which could result in detachment of the cables or other faults. While not shown in FIG. 8, the filter modules 802 and combiner 804 are fixed using a combination of plates and bars in a similar manner as described above with respect to FIGS. 1-7. In some examples, the hybrid design in FIG. 8 is covered in a manner similar to the examples shown in FIGS. 3-4. In some examples, the hybrid design in FIG. 8 is uncovered in a manner similar to the example shown in FIG. 1. It should be understood that a different number of plates and bars can be utilized depending on the number of filter modules and the design objectives for the hybrid design in FIG. 8.

In some examples, the modular filter system 800 can be modified in a manner similar to the modular filter system 100. In some examples where the modular filter system 800 is covered, the process for modification is more time consuming because it has the covered design. For example, if the adjustment to the combination of filter modules 802 includes replacing one filter module with another filter module (for example, swapping frequency bands or replacing a faulty module), a majority of bars must be removed before such a change can be implemented.

Unlike the modular filter system 100, it can be difficult to add certain frequency bands to the modular filter system 800 due to space constraints and the positioning of the filter modules 802. In particular, due to the orientation of some of the filter modules 802b-e, increasing the number of frequency bands may require expanding the dimensions of the modular filter system 800 perpendicular to the length of the modular filter system 800 depending on the combination of bands. This is problematic because the space within the bars and plates is limited and expansion that is parallel to the combiner 804 would require increasing the size of most, if not all, of the components.

The design of the modular filter system 800 can be more advantageous from an insertion loss perspective, particularly for combinations of frequency bands that have similarly sized filter modules 802. The insertion loss is reduced by minimizing the total cable length for some of the filter modules 802b-e. In such examples, the total cable length from the filter module to the combiner is considered as well as the cable length from the filter module to another component in (for example, the back panel or a power amplifier).

The modular filter system 100 described above with respect to FIGS. 1-2 has some advantages over the modular filter system 800 described above with respect to FIG. 8. For example, the assembly of the modular filter system 100 is generally easier since there are fewer components and less complexity in securing the components to each other. In examples where the hybrid design in FIG. 8 is covered, the rail design in FIG. 1 is also easier to visually inspect and debug as it is not covered like the hybrid design in FIG. 8. Further, the rail design in FIG. 1 can also be manufactured for slightly cheaper than the hybrid design in FIG. 8.

The modular filter system 800 described above with respect to FIG. 8 also has some advantages over the modular filter system 100 described above with respect to FIGS. 1-2. For example, the positioning of some of the filter modules 802b-e in the hybrid design enables shorter cables to be used for some of the filter modules, which leads to lower insertion loss compared to the rail design. The hybrid design also enables easier cable routing and attachment since the connectors for the filter modules 802b-e are more uniformly positioned and closer to the connectors of the combiner 804 and power amplifiers. Further, in the examples where the modular filter system 800 includes the plates surrounding the filter modules 802 and the combiner 804, it is easier to handle and manipulate than the modular filter system 100.

The design of the modular filter system 800 includes less sacrifice of radio frequency performance compared to the modular filter system 100, but the cost reduction and speed to market compared to the integrated approach discussed above is not as great. The design of the modular filter system 800 includes more sacrifice of radio frequency performance compared to the modular filter system 300, but the cost reduction and speed to market compared to the integrated approach discussed above is increased. The use of cabling between the filter modules and the combiner introduces more insertion loss than previous integrated approaches, but the modular filter system 800 still requires less development time and resources for individual requests than previous integrated designs. Further, the design of the modular filter system 800 includes swappable off-the-shelf modules that can be manufactured in bulk with reduced cost.

The examples described herein provide a design for duplexer/combiner systems 100, 300, 800 with more flexibility in manufacture than previously available. The arrangement of components in the modular filter system is not limited to an integrated rigid block design of previous systems, and the assembly of the modular filter system can be assembled with different combinations of frequency bands using off-the-shelf parts rather than requiring customized design. This flexibility significantly reduces production lead-time. Further, if a filter module fails in the field, the module can be easily replaced and only require a re-assembly of the modular filter system rather than necessitating replacement of the entire unit.

In some examples, the modular filter systems 100, 300, 800 are included in a remote unit of a distributed antenna system (DAS) that is communicatively coupled to a master unit of the DAS and can be used for indoor or outdoor distribution of radio frequency signals. In some examples, the modular filter system 100, 300, 800 is included in a medium-power or high-power remote unit. In other examples, the modular filter system 100, 300, 800 can be included in a radio frequency repeater, a radio point of a small cell, an access point, or another type of node of a telecommunications system configured to distribute radio frequency signals within a coverage area. While the modular filter system 100, 300, 800 is described with respect to telecommunications systems, it should be understood that the principles described herein are applicable for other technologies that include bi-directional communication using multiple frequency bands and a single antenna.

Figure 9:
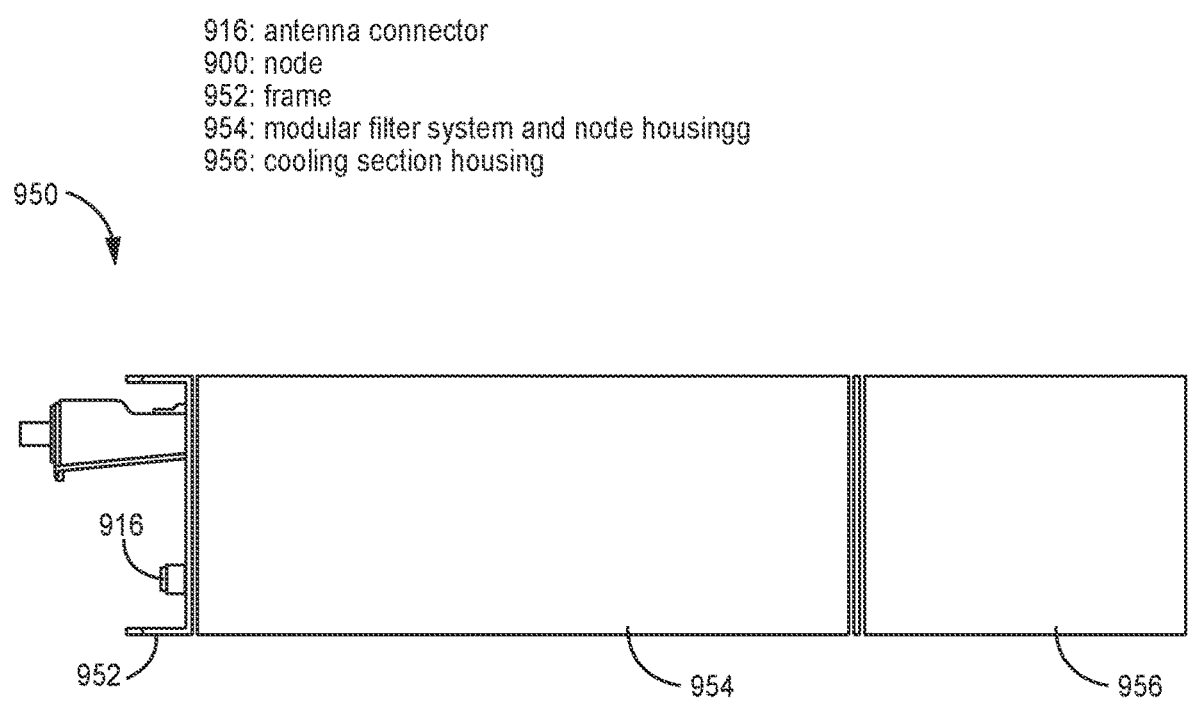
FIG. 9 is a side perspective view of an example node of a telecommunications system that includes a modular filter system.

FIG. 9 illustrates an example assembled node 950 of a telecommunications system that can include a modular filter system 100, 300, 800 described with respect to FIGS. 1-8 above. In the example shown in FIG. 9, the node includes a frame 952, a housing 954 to cover the modular filter system and other components of the node 950, and a housing 956 to cover a cooling section for the node 950.

The frame 952 is made of metal or other suitable rigid material. The frame 952 is attached to the front panel using fasteners (for example screws, rivets, or the like). The frame 952 is fixed along the perimeter of the end of the housing 954. In some examples, one or more seals are placed between the frame 952 and the front panel so the components of the node 950 are protected from dust and other contaminants in the environment surrounding the node 950.

In some examples, the housing 954 is an extruded rectangular tube. In some examples, the housing 954 is cut from a larger extrusion during manufacture, and the length of the housing 954 is flexible and easily adjusted. In some examples, the width and height of the housing are not easily adjusted during manufacture.

The design of the modular filter system 100 shown in FIG. 1 is particularly advantageous when using an extrusion for manufacturing the tube housing, such as that shown in FIG. 9, because the modular filter system 100 can grow in a single dimension (along the longitudinal axis of the node). When there is a high variability in demand for different combinations of frequency bands or when modifications to the remote unit need to be made after installation, a new extruded tube with the proper length can be easily manufactured. However, if adding bands requires expansion in multiple dimensions, then the manufacturing parameters for the tube housing would change, which would increase cost and/or render the extrusion method of manufacturing unusable.

In some examples, the node 950 further includes power amplifier modules for amplifying RF signals for transmission, and the power amplifier modules can be contained in the portion of the housing 954 shared by the modular filter system. In some examples, each power amplifier module is coupled to a respective downlink connector of a respective filter module. In some examples, the power amplifier modules comprise a plurality of high-power amplifiers mounted to bases that are stacked perpendicularly to the longitudinal axis of the node. In some examples, each power amplifier module includes a respective base. In some examples, respective power amplifiers are mounted to opposing sides of a common base.

In some examples, the node 950 includes additional components for processing signals in the uplink and downlink paths. In some examples, the node includes a signal processing board, one or more preamplifiers, gain blocks, or other features for conditioning the signals prior to amplification by the high-power amplifiers.

In the example shown in FIG. 9, a cooling section of the node 950 is enclosed with a separate housing 956 that provides protection for the components of the cooling section. In some examples, the housing 956 includes vents (not shown) in one side to facilitate the transfer of heat from the cooling section to the outside environment. In some examples, the cooling section includes one or more fans, and the housing 956 includes one or more holes to accommodate the fans. In some examples, the holes for accommodating the fans are positioned on the side opposite of a vent. In such examples, the fans can be configured to draw in ambient air and blow the air across one or more heat sinks in the cooling section such that warm air is forced out the vent on the other side.

While a separate housing 956 is shown in FIG. 9, it should be understood that the housing 954 can also be elongated to cover the cooling section as well in some examples. In such examples, the housing 954 can include a vent and/or holes to accommodate fans to facilitate heat transfer from the cooling section to the environment. Further, it should be understood that a housing for the cooling section is optional in some environments (for example, indoors) and the cooling section may include uncovered heat sinks and/or fans.

While FIG. 9 is described with respect to a remote unit, the beneficial features described above can be used for other nodes that distribute radio frequency signals to a coverage area. For example, similar designs can be implemented in a radio frequency repeater, radio point for a small cell, an access point, or other nodes of a telecommunications system. While the above examples include components of a telecommunications system, it should be understood that the modular filter systems 100, 300, 800 described herein can be implemented in other types of systems (for example, measurement systems) as well.

In various aspects, system elements, method steps, or examples described throughout this disclosure (such as the remote unit, or components thereof, for example) may be implemented on one or more computer systems, field programmable gate array (FPGA), application specific integrated circuit (ASIC) or similar devices comprising hardware executing code to realize those elements, processes, or examples, said code stored on a non-transient data storage device. These devices include or function with software programs, firmware, or other computer readable instructions for carrying out various methods, process tasks, calculations, and control functions, used for synchronization and fault management in a distributed antenna system.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a modular filter system, comprising: a front panel and a back panel; a multiband combiner coupled to the front panel, wherein the multiband combiner comprises an antenna connector and a plurality of filter connectors; a plurality of filter modules separate from the multiband combiner, wherein each filter module of the plurality of filter modules includes a first connector configured to pass a first frequency band, a second connector configured to pass a second frequency band, and a combiner connector configured to pass the first frequency band and the second frequency band, wherein each filter module of the plurality of filter modules is configured to duplex, combine, or split first signals in the first frequency band and second signals in the second frequency band, wherein the combiner connector of each filter module of the plurality of filter modules is coupled to a respective filter connector of the plurality of filter connectors using a respective cable; and a fixing system comprising a plurality of bars and a plurality of plates, wherein the plurality of bars is coupled to the front panel and the back panel using fasteners, wherein the plurality of bars and the plurality of plates are configured to secure the plurality of filter modules between the combiner and the back panel.

Example 2 includes the modular filter system of Example 1, wherein each filter module of the plurality of filter modules is oriented parallel to the front panel.

Example 3 includes the modular filter system of Example 2, wherein the modular filter system is configured to accommodate additional filter modules by expanding in a single dimension, wherein the modular filter system is configured to expand away from the front panel.

Example 4 includes the modular filter system of any of Examples 1-3, wherein the plurality of bars comprises: a first plurality of bars oriented perpendicular to the front panel and coupled to the front panel and the back panel using fasteners; and a second plurality of bars oriented perpendicular to the front panel and coupled to the front panel and the back panel using fasteners, wherein the first plurality of bars and the second plurality of bars are positioned on opposite sides of the plurality of filter modules.

Example 5 includes the modular filter system of Example 4, wherein the plurality of plates comprises a first plate oriented parallel to the front panel and positioned between at least two filter modules of the plurality of filter modules and a second plate oriented parallel to the front panel and positioned between the at least one filter module and the back panel.

Example 6 includes the modular filter system of any of Examples 4-5, wherein the plurality of bars further comprises: a third plurality of bars oriented perpendicular to the front panel and coupled to the combiner and one or more filter modules; and a fourth plurality of bars oriented perpendicular to the front panel and coupled to the combiner and one or more filter modules, wherein the third plurality of bars and the fourth plurality of bars are positioned on opposite sides of the plurality of filter modules; wherein the plurality of plates include four plates coupled to the first plurality of bars and the second plurality of bars using fasteners.

Example 7 includes the modular filter system of Example 6, wherein a first bar of the third plurality of bars includes a plurality of holes along a length of the first bar.

Example 8 includes the modular filter system of any of Examples 1-7, wherein a first filter module of the plurality of filter modules is configured to pass radio frequency signals less than 1 GHz, wherein a second filter module of the plurality of filter modules is configured to pass radio frequency signals higher than 1.4 GHz.

Example 9 includes the modular filter system of any of Examples 1-8, wherein a first filter module of the plurality of filter modules is positioned to minimize a length of the cable used to couple the respective combiner connector of the first filter module to the respective filter connector of the plurality of filter connectors.

Example 10 includes the modular filter system of any of Examples 1-9, wherein a first modular filter configured to pass radio frequency signals in a first frequency band combination can be swapped with a second modular filter configured to pass radio frequency signals in a second frequency band combination without modification to the multiband combiner or replacement of the multiband combiner.

Example 11 includes the modular filter system of any of Examples 1-10, wherein each filter module of the plurality of filter modules is oriented perpendicular to the front panel.

Example 12 includes the modular filter system of any of Examples 1-11, wherein the plurality of plates comprises at least one plate oriented perpendicular to the front panel, wherein the at least one plate is coupled between two or more filter modules.

Example 13 includes the modular filter system of any of Examples 1-12, wherein at least one filter module of the plurality of filter modules includes a groove configured to receive a single bar of the plurality of bars.

Example 14 includes the modular filter system of any of Examples 1-13, wherein at least one plate of the plurality of plates includes a notch configured to lock the at least one plate to a single bar of the plurality of bars.

Example 15 includes the modular filter system of any of Examples 1-14, wherein the modular filter system is integrated into a node of a telecommunications system, the node of the telecommunications system comprising: a plurality of power amplifiers, wherein each power amplifier is communicatively coupled to a respective filter module of the plurality of filter modules, wherein each power amplifier is coupled to a respective first connector of the respective filter module; and one or more processors configured to condition signals in at least one of the uplink path or downlink path of the node of the telecommunications system.

Example 16 includes the modular filter system of any of Examples 1-15, wherein the node of the telecommunications system comprises one of: a remote unit of a distributed antenna system; a radio frequency repeater; a radio point for a small cell; or an access point.

Example 17 includes the modular filter system of any of Examples 1-16, wherein a first filter module of the plurality filter modules is oriented perpendicular to the front panel; and wherein a second filter module of the plurality of filter modules is oriented parallel to the front panel.

Example 18 includes the modular filter system of Example 17, wherein the first filter module of the plurality of filter modules is configured to pass radio frequency signals less than 1 GHz, wherein the second filter module of the plurality of filter modules is configured to pass radio frequency signals higher than 1.4 GHz.

Example 19 includes the modular filter system of any of Examples 1-18, wherein the plurality of filter modules is a plurality of duplexer modules, wherein the first connector is a downlink connector, wherein the second connector is an uplink connector.

Example 20 includes the modular filter system of any of Examples 1-18, wherein the plurality of filter modules is a plurality of diplexer modules.

Example 21 includes the modular filter system of any of Examples 1-18, wherein the plurality of filter modules is a plurality of combiner modules.

Example 22 includes the modular filter system of any of Examples 1-18, wherein the plurality of filter modules is a plurality of splitter modules.

Example 23 includes a method of assembling a modular filter system, the method comprising: positioning a plurality of filter modules between two plates, wherein the plurality of filter modules are oriented perpendicular to a longitudinal axis of the modular filter system, wherein each filter module of the plurality of filter modules includes a first connector to pass a first frequency band, a second connector to pass a second frequency band, and a combiner connector to pass the first frequency band and the second frequency band, wherein each filter module of the plurality of filter modules is configured to duplex, combine, or split first signals in the first frequency band and second signals in the second frequency band; attaching a plurality of bars to the plates and the plurality of filter modules; connecting a cable to the combiner connector of each filter module and a respective connector of a multiband combiner; attaching the multiband combiner to the plurality of bars; attaching the front panel to the multiband combiner and the plurality of bars; and attaching the back panel to a plurality of the bars.

Example 24 includes the method of Example 23, further comprising connecting a respective cable to the first connector and the second connector of each filter module and a respective additional component in a communication path.

Example 25 includes a method of assembling a modular filter system, the method comprising: positioning a plurality of filter modules, wherein the plurality of filter modules are oriented parallel to a longitudinal axis of the modular filter system, wherein each filter module of the plurality of filter modules includes a first connector to pass a first frequency band, a second connector to pass a second frequency band, and a combiner connector to pass the first frequency band and the second frequency band, wherein each filter module of the plurality of filter modules is configured to duplex, combine, or split first signals in the first frequency band and second signals in the second frequency band; attaching a first plurality of bars to one or more filter modules on a first side of the modular filter system; connecting a cable to the combiner connector of each filter module and a respective connector of a multiband combiner; attaching a second plurality of bars to one or more filter modules on a second side of the modular filter system that is opposite the first plurality of bars; attaching the multiband combiner to the first plurality of bars and the second plurality of bars; attaching plates to the plurality of filter modules, the first plurality of bars, and second plurality of bars; attaching the front panel to the combiner; and attaching the back panel to a plurality of the bars.

Example 26 includes the method of Example 25, further comprising connecting a respective cable to the first connector and the second connector of each filter module and a respective additional component in a communication path.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A modular filter system, comprising:
a front panel and a back panel;
a multiband combiner coupled to the front panel, wherein the multiband combiner comprises an antenna connector and a plurality of filter connectors, wherein the multiband combiner has a passband filter for each filter connector of the plurality of filter connectors of the multiband combiner, wherein each passband filter has a passband sufficiently wide to pass multiple distinct frequency bands without modification to the multiband combiner;
a plurality of filter modules separate from the multiband combiner, wherein each filter module of the plurality of filter modules includes a first connector configured to pass a first frequency band, a second connector configured to pass a second frequency band, and a combiner connector configured to pass the first frequency band and the second frequency band, wherein each filter module of the plurality of filter modules is configured to duplex, combine, or split first signals in the first frequency band and second signals in the second frequency band, wherein the combiner connector of each filter module of the plurality of filter modules is coupled to a respective filter connector of the plurality of filter connectors of the multiband combiner using a respective cable; and a fixing system comprising a plurality of bars and a plurality of plates, wherein the plurality of bars is coupled to the front panel and the back panel using fasteners, wherein the plurality of bars and the plurality of plates are configured to secure the plurality of filter modules between the multiband combiner and the back panel.

2. The modular filter system of claim 1, wherein each filter module of the plurality of filter modules is oriented such that a length of the filter module is parallel to a face of the front panel.

3. The modular filter system of claim 2, wherein the modular filter system is configured to accommodate additional filter modules by expanding in a single dimension, wherein the modular filter system is configured to expand away from the face of the front panel.

4. The modular filter system of claim 1, wherein the plurality of bars comprises:
  a first plurality of bars oriented perpendicular to the front panel and coupled to the front panel and the back panel using fasteners; and
  a second plurality of bars oriented perpendicular to the front panel and coupled to the front panel and the back panel using fasteners, wherein the first plurality of bars and the second plurality of bars are positioned on opposite sides of the plurality of filter modules.

5. The modular filter system of claim 4, wherein the plurality of plates comprises a first plate oriented parallel to the front panel and positioned between at least two filter modules of the plurality of filter modules and a second plate oriented parallel to the front panel and positioned between the at least one filter module and the back panel.

6. The modular filter system of claim 4,
wherein the plurality of bars further comprises:
  a third plurality of bars oriented perpendicular to the front panel and coupled to the multiband combiner and one or more filter modules; and
  a fourth plurality of bars oriented perpendicular to the front panel and coupled to the multiband combiner and one or more filter modules, wherein the third plurality of bars and the fourth plurality of bars are positioned on opposite sides of the plurality of filter modules;
wherein the plurality of plates includes four plates coupled to the first plurality of bars and the second plurality of bars using fasteners.

7. The modular filter system of claim 6, wherein a first bar of the third plurality of bars includes a plurality of holes along a length of the first bar.

8. The modular filter system of claim 1, wherein a first filter module of the plurality of filter modules is configured to pass radio frequency signals less than 1 GHz, wherein a second filter module of the plurality of filter modules is configured to pass radio frequency signals higher than 1.4 GHz.

9. The modular filter system of claim 1, wherein a first filter module of the plurality of filter modules is positioned to minimize a length of the cable used to couple the respective combiner connector of the first filter module to the respective filter connector of the plurality of filter connectors of the multiband combiner.

10. The modular filter system of claim 1, wherein a first modular filter configured to pass radio frequency signals in a first frequency band combination can be swapped with a second modular filter configured to pass radio frequency signals in a second frequency band combination without modification to the multiband combiner or replacement of the multiband combiner.

11. The modular filter system of claim 1, wherein each filter module of the plurality of filter modules is oriented such that a length of the filter module is perpendicular to a face of the front panel.

12. The modular filter system of claim 1, wherein the plurality of plates comprises at least one plate oriented perpendicular to the front panel, wherein the at least one plate is coupled between two or more filter modules.

13. The modular filter system of claim 1, wherein at least one filter module of the plurality of filter modules includes a groove configured to receive a single bar of the plurality of bars.

14. The modular filter system of claim 1, wherein at least one plate of the plurality of plates includes a notch configured to lock the at least one plate to a single bar of the plurality of bars.

15. The modular filter system of claim 1, wherein the modular filter system is integrated into a node of a telecommunications system, the node of the telecommunications system comprising:
  a plurality of power amplifiers, wherein each power amplifier is communicatively coupled to a respective filter module of the plurality of filter modules, wherein each power amplifier is coupled to a respective first connector of the respective filter module; and
  one or more processors configured to condition signals in at least one of an uplink path or downlink path of the node of the telecommunications system.

16. The modular filter system of claim 15, wherein the node of the telecommunications system comprises one of:
  a remote unit of a distributed antenna system;
  a radio frequency repeater;
  a radio point for a small cell; or
  an access point.

17. The modular filter system of claim 1, wherein a first filter module of the plurality filter modules is oriented such that a length of the first filter module is perpendicular to a face of the front panel; and
  wherein a second filter module of the plurality of filter modules is oriented such that a length of the second filter module is parallel to the face of the front panel.

18. The modular filter system of claim 17, wherein the first filter module of the plurality of filter modules is configured to pass radio frequency signals less than 1 GHz, wherein the second filter module of the plurality of filter modules is configured to pass radio frequency signals higher than 1.4 GHz.

19. The modular filter system of claim 1, wherein the plurality of filter modules is a plurality of duplexer modules, wherein the first connector is a downlink connector, wherein the second connector is an uplink connector.

20. The modular filter system of claim 1, wherein the plurality of filter modules is a plurality of diplexer modules.

21. The modular filter system of claim 1, wherein the plurality of filter modules is a plurality of combiner modules.

22. The modular filter system of claim 1, wherein the plurality of filter modules is a plurality of splitter modules.

23. A method of assembling a modular filter system, the method comprising:

positioning a plurality of filter modules between two plates, wherein the plurality of filter modules are oriented perpendicular to a longitudinal axis of the modular filter system, wherein each filter module of the plurality of filter modules is oriented such that a length of the filter module is perpendicular to a face of a front panel of the modular filter system, wherein each filter module of the plurality of filter modules includes a first connector to pass a first frequency band, a second connector to pass a second frequency band, and a combiner connector to pass the first frequency band and the second frequency band, wherein each filter module of the plurality of filter modules is configured to duplex, combine, or split first signals in the first frequency band and second signals in the second frequency band;

attaching a plurality of bars to the plates and the plurality of filter modules;

connecting a cable to the combiner connector of each filter module and a respective connector of a multiband combiner, wherein the multiband combiner includes a passband filter for each respective connector of the multiband combiner that has a passband sufficiently wide to pass multiple distinct frequency bands without modification to the multiband combiner;

attaching the multiband combiner to the plurality of bars;

attaching the front panel to the multiband combiner and the plurality of bars; and attaching a back panel to a plurality of the bars.

24. The method of claim 23, further comprising connecting a respective cable to the first connector and the second connector of each filter module and a respective additional component in a communication path.

25. A method of assembling a modular filter system, the method comprising:

positioning a plurality of filter modules, wherein the plurality of filter modules are oriented parallel to a longitudinal axis of the modular filter system, wherein each filter module of the plurality of filter modules is oriented such that a length of the filter module is parallel to a face of a front panel of the modular filter system, wherein each filter module of the plurality of filter modules includes a first connector to pass a first frequency band, a second connector to pass a second frequency band, and a combiner connector to pass the first frequency band and the second frequency band, wherein each filter module of the plurality of filter modules is configured to duplex, combine, or split first signals in the first frequency band and second signals in the second frequency band;

attaching a first plurality of bars to one or more filter modules on a first side of the modular filter system;

connecting a cable to the combiner connector of each filter module and a respective connector of a multiband combiner, wherein the multiband combiner includes a passband filter for each respective connector of the multiband combiner that has a passband sufficiently wide to pass multiple distinct frequency bands without modification to the multiband combiner;

attaching a second plurality of bars to one or more filter modules on a second side of the modular filter system that is opposite the first plurality of bars;

attaching the multiband combiner to the first plurality of bars and the second plurality of bars;

attaching plates to the plurality of filter modules, the first plurality of bars, and second plurality of bars;

attaching the front panel to the multiband combiner; and attaching a back panel to a plurality of the bars.

26. The method of claim 25, further comprising connecting a respective cable to the first connector and the second connector of each filter module and a respective additional component in a communication path.

* * * * *